United States Patent
Jung et al.

(10) Patent No.: US 11,959,762 B2
(45) Date of Patent: Apr. 16, 2024

(54) VEHICLE AND METHOD OF CONTROLLING THE SAME

(71) Applicants: Hyundai Motor Company, Seoul (KR); Kia Corporation, Seoul (KR)

(72) Inventors: Jae Wung Jung, Bucheon-Si (KR); Dong Hyun Ha, Seoul (KR); Jung Hun Choi, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 39 days.

(21) Appl. No.: 17/850,842

(22) Filed: Jun. 27, 2022

(65) Prior Publication Data

US 2023/0152113 A1    May 18, 2023

(30) Foreign Application Priority Data

Nov. 18, 2021    (KR) .................. 10-2021-0159087

(51) Int. Cl.
| | |
|---|---|
| *G06V 10/70* | (2022.01) |
| *G01C 21/36* | (2006.01) |
| *G06F 3/0482* | (2013.01) |
| *G06V 10/74* | (2022.01) |
| *G06V 10/82* | (2022.01) |
| *G06V 20/30* | (2022.01) |
| *G06V 20/59* | (2022.01) |

(52) U.S. Cl.
CPC ...... *G01C 21/3617* (2013.01); *G01C 21/3611* (2013.01); *G01C 21/3661* (2013.01); *G06F 3/0482* (2013.01); *G06V 10/761* (2022.01); *G06V 10/82* (2022.01); *G06V 20/30* (2022.01); *G06V 20/59* (2022.01)

(58) Field of Classification Search
CPC ..... G06F 16/9355; G06F 3/0482; G06T 7/00; G06T 2207/20084; G06V 10/70; G06V 10/235; G06V 20/35; G06V 20/20; G06V 20/59; G06V 10/74; G06V 10/762; G06V 10/82; G01C 21/605; G01C 21/3617; G01C 21/3611; G01C 21/3661; G06N 20/00
USPC .......................................... 701/446, 431, 27
See application file for complete search history.

(56) References Cited

U.S. PATENT DOCUMENTS

| | | | |
|---|---|---|---|
| 9,582,826 B2* | 2/2017 | Calman | G06Q 30/0639 |
| 10,929,986 B2* | 2/2021 | Wang | G06T 7/277 |
| 11,610,413 B1* | 3/2023 | Nguyen | G06V 20/44 |

(Continued)

OTHER PUBLICATIONS

Y. Deng, T. Zhang, G. Lou, X. Zheng, J. Jin and Q.-L. Han, "Deep Learning-Based Autonomous Driving Systems: A Survey of Attacks and Defenses," in IEEE Transactions on Industrial Informatics, vol. 17, No. 12, pp. 7897-7912, Dec. 2021, doi: 10.1109/TII.2021. 3071405 (Year: 2021).*

(Continued)

*Primary Examiner* — Cuong H Nguyen
(74) *Attorney, Agent, or Firm* — MORGAN, LEWIS & BOCKIUS LLP (57) ABSTRACT

A vehicle includes a user interface; and a controller configured to determine a predicted place where an image is predicted to have been captured according to an output of a place prediction neural network for the image selected by a user, and control the user interface to perform a route guide to the predicted place, wherein the place prediction neural network is learned from an image tagged with place information.

12 Claims, 9 Drawing Sheets

(56) References Cited

U.S. PATENT DOCUMENTS

2022/0117218 A1*  4/2022  Sibley ................. A01M 7/0042
2022/0156500 A1*  5/2022  Yoon ......................... G06T 7/20
2023/0067615 A1*  3/2023  Bond ................... G06V 10/768

OTHER PUBLICATIONS

Liu, Shengzhong, et al. "On removing algorithmic priority inversion from mission-critical machine inference pipelines." 2020 IEEE Real-Time Systems Symposium (RTSS). IEEE, (Year: 2020).*

A. Qayyum, M. Usama, J. Qadir and A. Al-Fuqaha, "Securing Connected & Autonomous Vehicles: Challenges Posed by Adversarial Machine Learning and the Way Forward," in IEEE Communications Surveys & Tutorials, vol. 22, No. 2, pp. 998-1026, (Year: 2020).*

Datondji, Sokemi Rene Emmanuel, et al. "A survey of vision-based traffic monitoring of road intersections." IEEE transactions on intelligent transportation systems 17.10 (2016): 2681-2698 (Year: 2016).*

Duraisamy, Premkumar, et al. "Improved Recommender System for Kid's Hobby Prediction using different Machine Learning Techniques." 2023 Fifth International Conference on Electrical, Computer and Communication Technologies (Icecct). IEEE, 2023. (Year: 2023).*

S. K. Mohapatra et al., "Comparative Approaches by using Machine Learning Algorithms in Breast Cancer Prediction," 2022 2nd Inter. Conf. on Advance Computing and Innovative Technologies in Engineering (ICACITE), Greater Noida, India, 2022, pp. 1874-1878,doi: 10.1109/ICACITE53722.2022.9823470. (Year: 2022).*

* cited by examiner

VEHICLE AND METHOD OF CONTROLLING THE SAME

CROSS-REFERENCE TO RELATED APPLICATION(S)

The present application claims priority to Korean Patent Application No. 10-2021-0159087, filed on Nov. 18, 2021 the entire contents of which is incorporated herein for all purposes by this reference.

BACKGROUND OF THE PRESENT DISCLOSURE

Field of the Present Disclosure

The present disclosure relates to a vehicle configured for recommending and guiding a destination and a method of controlling the same.

Description of Related Art

In general, a vehicle utilizes a global positioning system (GPS) signal to inform a precise distance and a required time from a current location to a destination, and performs guiding a route to the destination.

However, a vehicle requires user intervention, such as receiving a destination input from a user, and convenience or satisfaction of the user may be reduced in that the user have to know the destination accurately.

Accordingly, although development of destination recommendation algorithms which may satisfy a user while minimizing a user's intervention is actively ongoing, it is only the degree to which a destination setting history of the user is used.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for predicting a destination according to an output of a neural network for an image stored in a user terminal or proposing a destination that matches a user's hobby, and a method of controlling the same.

Additional aspects of the present disclosure will be set forth in part in the description which follows, and in part, will be obvious from the description, or may be learned by practice of the present disclosure.

In accordance with an aspect of the present disclosure, a vehicle includes a user interface; and a controller configured to determine a predicted place where an image is predicted to have been captured based on an output of a place prediction neural network for the image selected by a user, and control the user interface to perform a route guide to the predicted place, wherein the place prediction neural network is learned from an image tagged with a place information.

The vehicle may further include a communicator communicatively connected to the controller and configured to perform communication with a user terminal, wherein the controller is configured to receive the image selected by the user from the user terminal through the communicator.

The controller may be configured to, in response to receiving an image stored in the user terminal from the user terminal through the communicator, control the user interface to display the received image, and determine the image selected by the user based on a user selection for any one of the displayed images through the user interface.

The vehicle may further include an external image sensor configured to photograph an outside of the vehicle, wherein the controller is configured to control the communicator to transmit an image data obtained from the external image sensor to the user terminal.

The controller may be configured to, in response that the predicted place is plural, determine at least one prediction place with high prediction accuracy among a plurality of prediction places, control the user interface to display information on the at least one prediction place, and control the user interface to perform the route guide to the predicted place selected through the user interface among the prediction places.

The controller may be configured to determine a plurality of images captured within a predetermined distance from a current location of the vehicle among images stored in the user terminal, and group the plurality of images for each photographing place based on the output of the place prediction neural network for the plurality of images.

The controller may be configured to determine a predicted hobby predicted as a hobby of the user based on an output of a hobby prediction neural network that receives an image of a group including the most images among a plurality of groups grouped and a destination stay time for each day of the week as an input thereof.

The controller may be configured to determine a hobby performance prediction place where the predicted hobby is expected to be performed based on the output of the hobby performance place prediction neural network for the predicted hobby, and control the user interface to display a list of recommended destinations corresponding to the hobby performance prediction place.

The controller may be configured to control the user interface to guide a photographing place of an image captured at a place corresponding to the hobby performance prediction place among the plurality of images.

The controller may be configured to in response that a group including an image similar to an image of a destination input by the user within a predetermined distance from a current location of the vehicle among a plurality of groups grouped is identified, determine a photographing place corresponding to the group as a recommended destination, and control the user interface to perform a route guide to the recommended destination.

The controller may be further configured to, in response to receiving a birthday data from the user terminal through the communicator, control the user interface to output a birthday guide message based on the birthday data.

The vehicle may further include an indoor image sensor configured to photograph an interior of the vehicle, wherein the controller is configured to control the user interface to output the birthday guide message in response to determining that an occupant with a birthday exists by comparing the birthday data with image data obtained from the indoor image sensor.

The controller may be further configured to control the user interface to output the birthday guide message in response to determining that a predetermined person having a birthday exists based on the birthday data.

In accordance with another aspect of the present disclosure, a method of controlling a vehicle including a user interface, the method includes determining a predicted place where an image is predicted to have been captured based on an output of a place prediction neural network for an image selected by a user; and controlling the user interface to perform a route guide to the predicted place; wherein the place prediction neural network is learned from an image tagged with a place information.

The method may further include a communicator communicatively connected to the controller and configured to perform communication with a user terminal, and wherein the method may further include receiving the image selected by the user from the user terminal through the communicator.

The method may further include, in response to receiving an image stored in the user terminal from the user terminal through the communicator, controlling the user interface to display the received image, and determining the image selected by the user based on a user selection for any one of the displayed images through the user interface.

The method may further include an external image sensor configured to photograph an outside of the vehicle, wherein the method may further include controlling the communicator to transmit an image data obtained from the external image sensor to the user terminal.

The controlling may further include, in response that the predicted place is plural, determining at least one prediction place with high prediction accuracy among the plurality of prediction places; controlling the user interface to display information on the at least one prediction place; and controlling the user interface to perform the route guide to the predicted place selected through the user interface among the at least one prediction place.

The method may further include determining a plurality of images captured within a predetermined distance from a current location of the vehicle among images stored in the user terminal; and grouping the plurality of images for each photographing place based on the output of the place prediction neural network for the plurality of images.

The method may further include determining a predicted hobby predicted as a hobby of the user based on an output of a hobby prediction neural network that receives an image of a group including the most images among a plurality of groups grouped and a destination stay time for each day of the week as an input thereof; determining a hobby performance prediction place where the predicted hobby is expected to be performed based on the output of the hobby performance place prediction neural network for the predicted hobby; and controlling the user interface to display a list of recommended destinations corresponding to the hobby performance prediction place.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplary embodiments of the present disclosure, examples of which are illustrated in the accompanying drawings, wherein like reference numerals refer to like elements throughout. The present specification does not describe all elements of the disclosed exemplary embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

Figure 1:
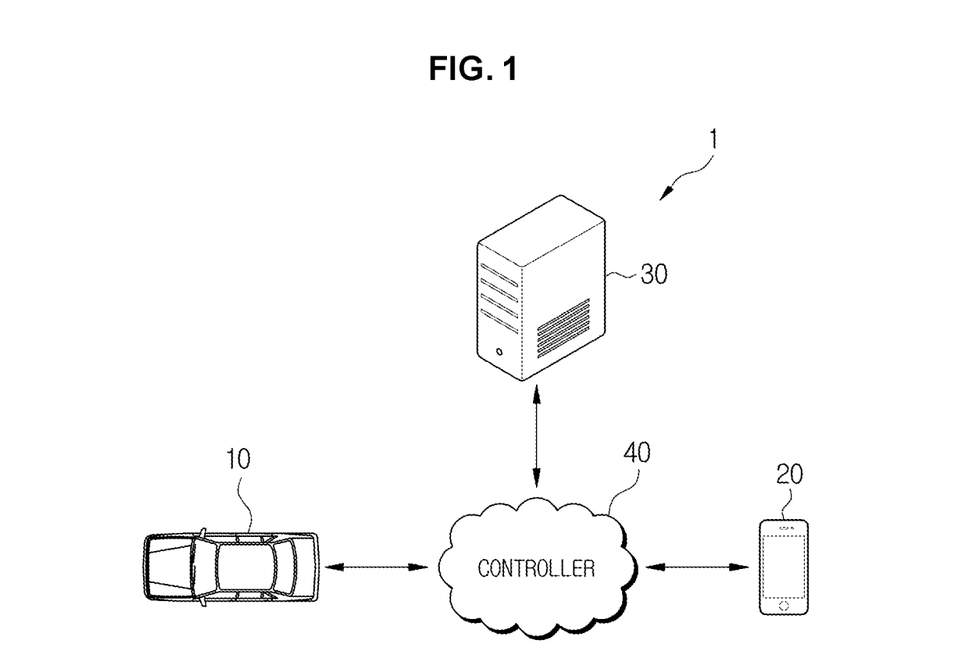
FIG. 1 is an external view exemplarily illustrating a destination recommendation system according to an exemplary embodiment of the present disclosure.

FIG. 1 is an external view of a destination recommendation system according to an exemplary embodiment of the present disclosure.

Referring to FIG. 1, a destination recommendation system 1 according to an exemplary embodiment of the present disclosure may include a vehicle 10 that recommends a destination, a user terminal 20 that stores an image and provides the image to the vehicle 10, a server 30 that provides a neural network for analyzing the image, and a network 40 that supports communication between the vehicle 10, the user terminal 20, and the server 30.

The vehicle 10 according to various exemplary embodiments of the present disclosure may recommend a destination according to an output of the neural network for the image provided from the user terminal 20. This will be described in detail again later.

The user terminal 20 according to various exemplary embodiments of the present disclosure may store an image and transmit the image to the vehicle 10. In the instant case, the image stored in the user terminal 20 may be photographed by the user terminal 20, obtained on the Internet by the user, or photographed by the vehicle 10.

FIG. 1 is shown that the vehicle 10 and the user terminal 20 communicate through the network 40, but is not limited thereto, and the vehicle 10 and the user terminal 20 may communicate without passing through the network 40 such as Bluetooth, adjacent to field communication (NFC), or the like.

The server 30 according to various exemplary embodiments of the present disclosure may learn a neural network required for a destination recommendation to supply the neural network to the vehicle 10. In the instant case, the server 30 may transmit an updated neural network to the vehicle 10 whenever the neural network is newly learned and updated. Accordingly, the vehicle 10 may receive the neural network from the server 30 in an over-the-air (OTA) manner to maintain the latest version of the neural network.

Because the above-mentioned neural network refers to machine learning that embodies neural structures configured for performing deep learning, the weight and bias corresponding to configuration of the neural network continuously change, improving the reliability of learning.

The server 30 may improve the inference result of the neural network by continuously updating weights, biases, and activation functions included in the neural network based on learning data.

In the instant case, the neural network may be stored in the vehicle 10 in a form of a computer program. Hereinafter, the performance of operations processed by the neural network will be described in a form of coding of the computer program, but the neural network is not necessarily limited to the stored computer program.

On the other hand, the neural network may include a convolutional neural network (CNN) that generates a features map output by convolution of an X-ray image and inputs the features map to the neural network, but is not limited thereto. The neural network may also be performed with different deep learning algorithms including a recurrent neural network (RNN).

Figure 2:
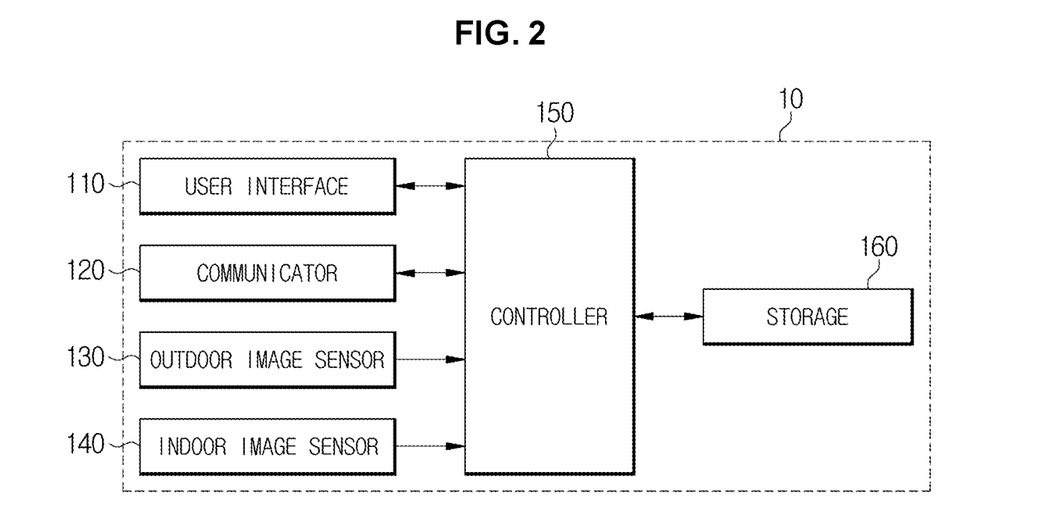
FIG. 2 is a control block view exemplarily illustrating a vehicle according to an exemplary embodiment of the present disclosure.

FIG. 2 is a control block view exemplarily illustrating the vehicle 10 according to an exemplary embodiment of the present disclosure.

Referring to FIG. 2, the vehicle 10 according to an exemplary embodiment of the present disclosure includes a user interface 110 that receives an input from a user or displays data, a communicator 120 that communicates with the user terminal 20 and the server 30, an external image sensor 130 that obtains image data on an outside of the vehicle 10, an indoor image sensor 140 that obtains image data on an interior of the vehicle 10, a controller 150 that determines a recommended destination based on an image selected by a user from among the stored images, and a storage 160 that stores various types of information and neural networks necessary for determining the recommended destination.

The user interface 110 according to various exemplary embodiments of the present disclosure may include an inputter configured for receiving a user input, a display configured for outputting data, and a speaker. In the instant case, the inputter may be provided in a known type, and according to an exemplary embodiment of the present disclosure, may be a touch panel provided integrally with the display. The display may be provided with a known type of display panels, and the speaker may also be provided with a known type.

The communicator 120 according to various exemplary embodiments of the present disclosure may communicate with the user terminal 20 and the server 30 through a wireless communication, and for the present purpose, a known type of wireless communication module may be used.

The external image sensor 130 according to various exemplary embodiments of the present disclosure may obtain image data including an external field of view of the vehicle 10, and may be provided as a known type of image sensor.

The indoor image sensor 140 according to various exemplary embodiments of the present disclosure may obtain image data including an internal field of view of the vehicle 10, and may be provided as a known type of image sensor.

The controller 150 according to various exemplary embodiments of the present disclosure may determine the recommended destination based on the output of the neural network for the image selected by the user among the images stored in the user terminal 20, and control the user interface 110 to perform a route guide to the recommended destination. In the instant case, the images stored in the user terminal 20 may be photographed by the user terminal 20, obtained on the Internet by the user, or photographed by the vehicle 10.

Furthermore, the controller 150 according to various exemplary embodiments of the present disclosure may identify an image captured within a predetermined distance from a current location of the vehicle 10 from among the images stored in the user terminal 20, group the identified photos for each photographing place based on the output of the neural network, predict a hobby based on the output of the neural network for the group with the highest frequency, determine a hobby performance prediction place where the corresponding hobby is expected to be performed based on the output of the neural network fora predicted hobby, and control the user interface 110 to display a list of recommended destinations corresponding to the hobby performance prediction place.

Furthermore, the controller 150 according to various exemplary embodiments of the present disclosure may control the user interface 110 to guide the photographing place of the image captured at a place corresponding to the hobby performance prediction place among the identified images.

Furthermore, the controller 150 according to an exemplary embodiment of the present disclosure, in response that a group including an image similar to the image of the destination input by the user within a predetermined distance from the current location of the vehicle 10 among a plurality of groups grouped is identified, may determine the photographing place corresponding to the group as the recommended destination, and control the user interface 110 to perform a route guide to the recommended destination.

Furthermore, the controller 150 according to an exemplary embodiment of the present disclosure, in response to receiving birthday data from the user terminal 20 through the communicator 120, may control the user interface 110 to output a birthday guide message based on the birthday data.

The controller 150 may control the user interface 110 to output the birthday guide message in response to determining that an occupant with a birthday exists by comparing the image data obtained through the indoor image sensor with the birthday data.

Furthermore, the controller 150 may control the user interface 110 to output the birthday guide message in response to determining that a friend who has a birthday person based on the birthday data.

The controller 150 may include at least one memory in which a program for performing the above-described operation and an operation to be described later is stored, and at least one processor for executing the stored program. When the memory and the processor are plural, they may be integrated on one chip or may be provided to be physically separated.

The storage 160 according to various exemplary embodiments of the present disclosure may store various types of information for determining the recommended destination. For example, the storage 160 may store the latest version of the neural network received from the server 30. To this end, the storage 160 may include a known type of storage medium.

In the above, each configuration of the vehicle 10 has been described. Hereinafter, a description will be provided of determining the recommended destination based on the output of the neural network for the image selected by a user.

Figure 3:
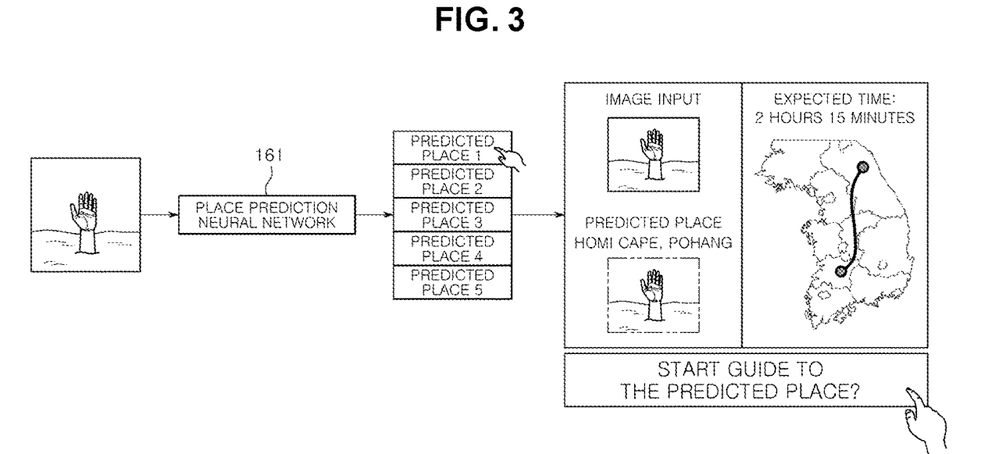
FIG. 3 is a view exemplarily illustrating a case in which a vehicle according to an exemplary embodiment of the present disclosure recommends a destination based on an image selected by a user.

FIG. 3 is a view exemplarily illustrating a case in which the vehicle 10 according to an exemplary embodiment of the present disclosure recommends a destination based on the image selected by the user.

Referring to FIG. 3, the vehicle 10 according to various exemplary embodiments of the present disclosure may determine a predicted place where an image is predicted to have been captured according to an output of a neural network 161 for predicting a place (hereinafter also referred to as a place prediction neural network) for the image selected by the user, and control the user interface 110 to perform a route guide to the predicted place.

In the instant case, the place prediction neural network 161 may be learned from an image in which place information (e.g., a place name or place information (GPS coordinates, etc.)) is tagged. That is, the user of the server 30 may train the place prediction neural network 161 using the image tagged with the place information. In other words, the server 30 continuously updates the weights, the biases, and the activation functions included in the place prediction neural network 161 based on training data, improving inference result of the neural network.

The vehicle 10, according to an exemplary embodiment of the present disclosure, may receive the image selected by the user from the user terminal 20 through the communicator 120. In other words, the user may select the image by use of the user terminal 20, and in the instant case, the user terminal 20 transmits the image selected by the user to the vehicle 10 so that the vehicle 10 may identify the image selected by the user.

The vehicle 10, according to an exemplary embodiment of the present disclosure, may control the user interface 110 to display the received image in response to receiving the image stored in the user terminal 20 from the user terminal 20 through the communicator 120, and determine the image selected by the user based on the user selection for any one of the images displayed through the user interface 110.

Accordingly, the user may select an image of a place where he/she wants to go from among the images stored in the user terminal 20 through the user terminal 20 or the vehicle 10 and be provided with a route guide from the vehicle 10 to the corresponding place. In other words, even if the user does not know where the place in the image is, the user may receive the route guide from the vehicle 10.

In the instant case, the images stored in the user terminal 20 may be photographed by the user terminal 20, obtained on the Internet by the user, or photographed by the vehicle 10. In other words, the vehicle 10, according to an exemplary embodiment of the present disclosure, may control the communicator 120 to transmit image data obtained from the external image sensor 130 to the user terminal 20, and the user terminal 20 may store the images transmitted from the vehicle 10. Accordingly, when the user desires to guide the vehicle 10 to a place of the image captured while traveling, the user may be provided with a route guide to the place by selecting the corresponding image.

Furthermore, when the predicted place is plural, the vehicle 10 may determine at least one prediction place with high prediction accuracy among a plurality of prediction places, control the user interface 110 to display information on the at least one prediction places (prediction places 1 to 5) as shown in FIG. 3, and control the user interface 110 to perform a route guide to the predicted place (prediction place 1) selected through the user interface 110 among the at least one prediction place.

Figure 4:
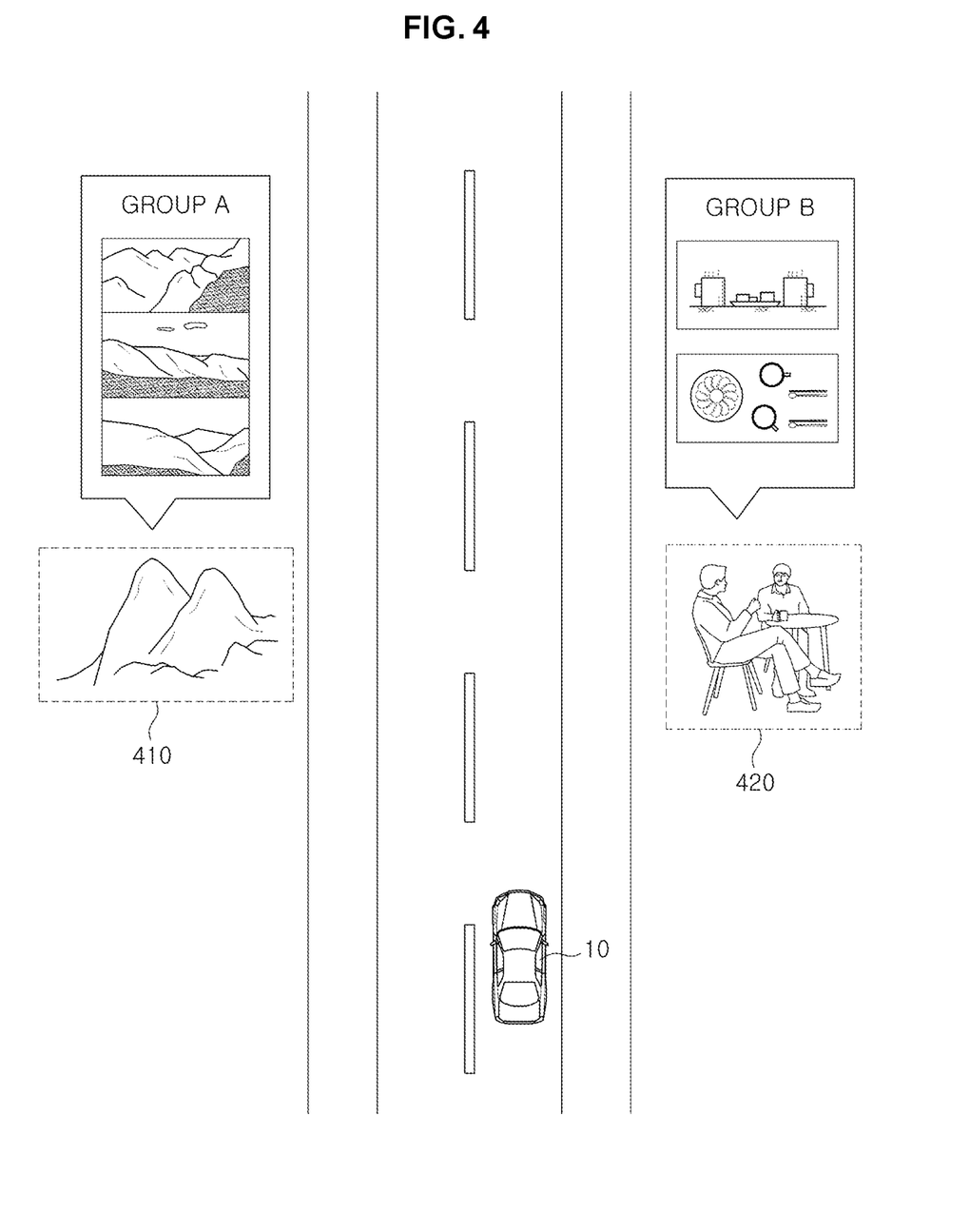
FIG. 4 is a view exemplarily illustrating an example in which a vehicle according to an exemplary embodiment of the present disclosure groups past images captured in a vicinity of a driving route of a vehicle.
Figure 5:
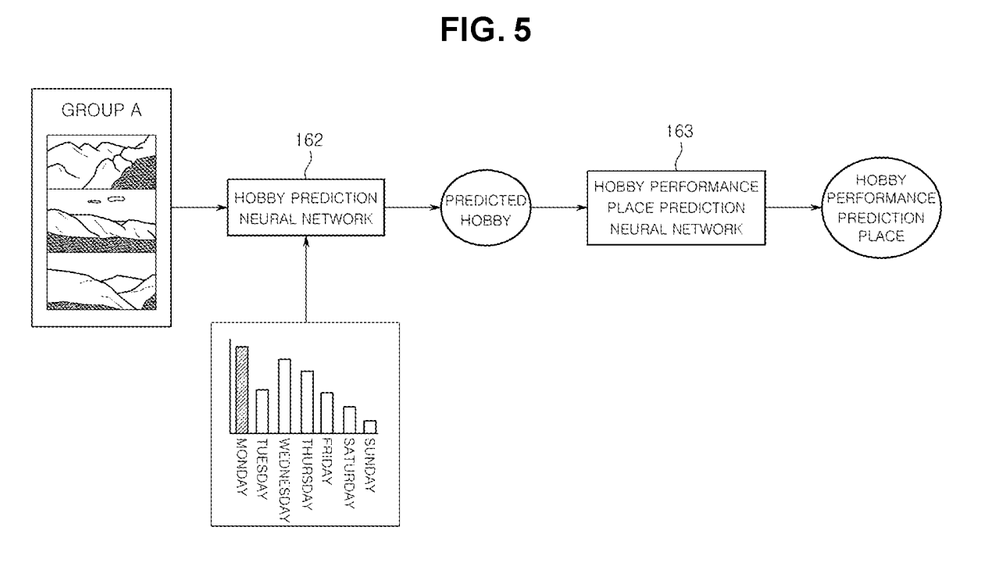
FIG. 5 is a view exemplarily illustrating an example in which a vehicle according to an exemplary embodiment of the present disclosure determines a hobby performance prediction place.
Figure 6:
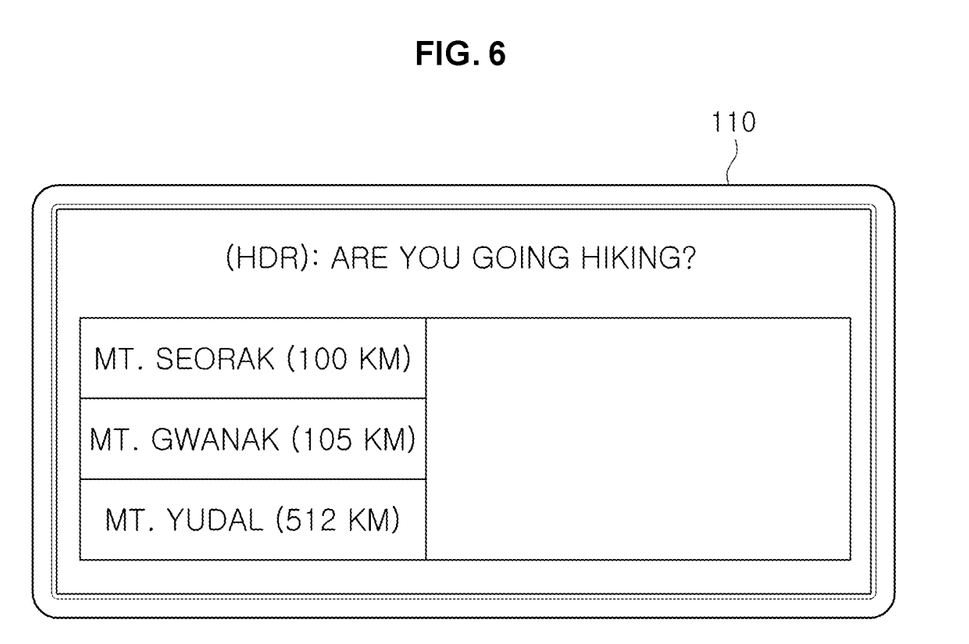
FIG. 6 is a view exemplarily illustrating an example in which a vehicle according to an exemplary embodiment of the present disclosure displays a recommendation list based on the hobby performance prediction place.
Figure 7:
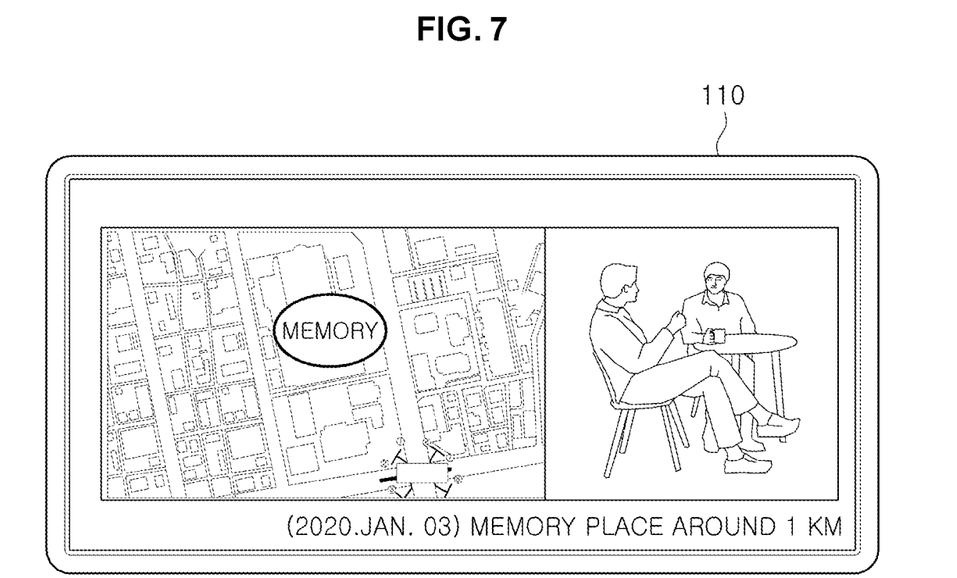
FIG. 7 is a view exemplarily illustrating an example in which a vehicle according to an exemplary embodiment of the present disclosure guides a memory place on the driving route.
Figure 8:
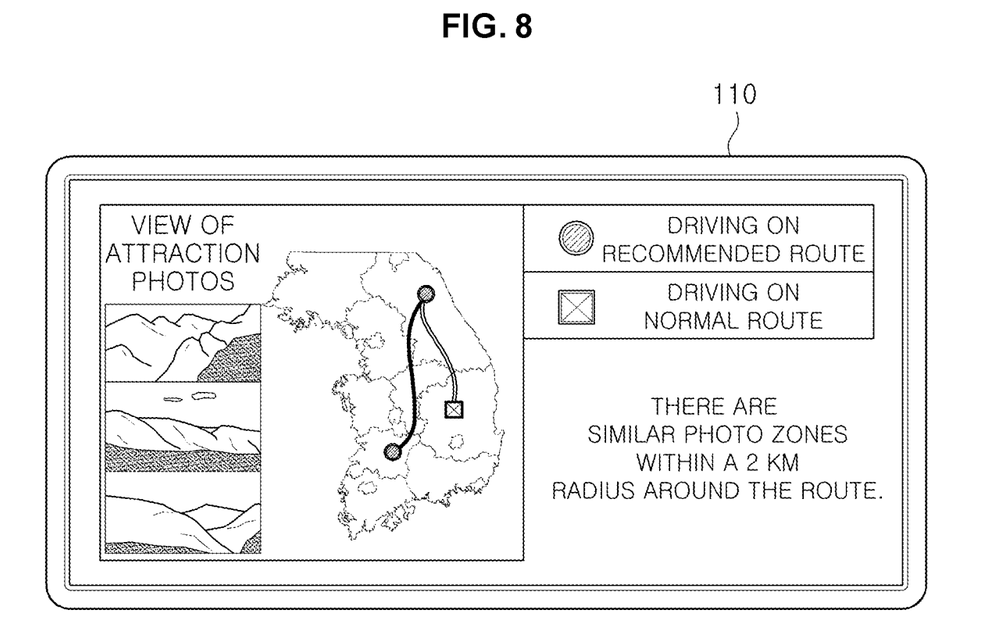
FIG. 8 is a view exemplarily illustrating an example in which a vehicle according to an exemplary embodiment of the present disclosure recommends a place where an image similar to a destination is captured.

FIG. 4 is a view exemplarily illustrating an example in which the vehicle 10 according to an exemplary embodiment of the present disclosure groups past images captured in a vicinity of a driving route. FIG. 5 is a view exemplarily illustrating an example in which the vehicle 10 according to an exemplary embodiment of the present disclosure determines a hobby performance prediction place. FIG. 6 is a view exemplarily illustrating an example in which the vehicle 10 according to an exemplary embodiment of the present disclosure displays a recommendation list based on the hobby performance prediction place. FIG. 7 is a view exemplarily illustrating an example in which the vehicle 10 according to an exemplary embodiment of the present disclosure guides a memory place on the driving route. FIG. 8 is a view exemplarily illustrating an example in which the vehicle 10 according to an exemplary embodiment of the present disclosure recommends a place where an image similar to the destination is captured.

Referring to FIG. 4, the vehicle 10 according to various exemplary embodiments of the present disclosure may determine a plurality of images captured within a predetermined distance (e.g., 3 km) from the current location of the vehicle 10 among the images stored in the user terminal 20, and group the plurality of images for each photographing place based on the output of the place prediction neural network 161 for the plurality of images.

For example, as shown in FIG. 4, the vehicle 10 may group images with the mountain 410 as a photographing place into group A, and group images with the cafe 420 as a photographing place into group B.

Referring to FIG. 5 and FIG. 6, the vehicle 10 may determine the predicted hobby predicted as the user's hobby based on the output of a neural network 162 for predicting a hobby (hereinafter also referred to as a hobby prediction neural network) that receives an image of a group (e.g., group A) including the most images among the plurality of groups grouped and destination stay time for each day of the week as an input thereof. In the instant case, the hobby prediction neural network 162 may be learned based on the images tagged with the hobby information by the server 30.

The vehicle 10 may adjust a weight of the neural network in a direction to increase with respect to an image captured on a day of the week including a long destination stay time. For example, the vehicle 10 may obtain the output of the neural network by giving a higher weight to the image captured on Saturday when the stay time (parking time) at the destination is long on Saturday, and if on Saturday many images are captured in the mountain, the neural network may determine hiking as the user's predictive hobby.

Furthermore, the vehicle 10 may determine the hobby performance prediction place where the predicted hobby is expected to be performed based on the output of a hobby performance place prediction neural network 163 for the predicted hobby, and control the user interface 110 to display the list of recommended destinations corresponding to the hobby performance prediction place.

For example, in response to determining that hiking is the predicted hobby, the vehicle 10 may determine the hobby performance prediction place as mountain, and as shown in FIG. 6, display the list of recommended destinations corresponding to mountain (e.g., Seorak Mountain, Gwanak Mountain, Yudal Mountain, etc.). In the instant case, the vehicle 10 may determine the destination corresponding to a type of the hobby performance prediction place as the recommended destinations using a main destination list stored in the storage 160, and display the recommended destinations as a list. The vehicle 10 may provide a route guide to the selected destination in response that any one of the list of recommended destinations is selected by the user.

Referring to FIG. 7, the vehicle 10 according to various exemplary embodiments of the present disclosure may control the user interface 110 to guide the photographing place of an image captured at a place corresponding to the hobby performance prediction place among the plurality of images.

In other words, the vehicle 10 may control the user interface 110 to guide the user to a memory place by determining a photographing place of the image captured at a place corresponding to the hobby performance prediction place as the memory place.

For example, the vehicle 10 may display a memory place on a map, as shown in FIG. 7, and display information (e.g., photographing date, etc.) of images and images captured in the memory place.

Referring to FIG. 8, vehicle 10 according to an exemplary embodiment of the present disclosure, in response that a group including an image similar to the image of the destination input by the user within the predetermined distance from the current location of the vehicle 10 among the plurality of groups grouped is identified, may determine a photographing place corresponding to the group as the recommended destination, and control the user interface 110 to perform a route guide to the recommended destination.

In other words, the vehicle 10, in response that a place including the image similar to the destination set by the user exists within a predetermined distance, may guide the corresponding place and perform the route guide to the corresponding place based on the user selection.

Figure 9:
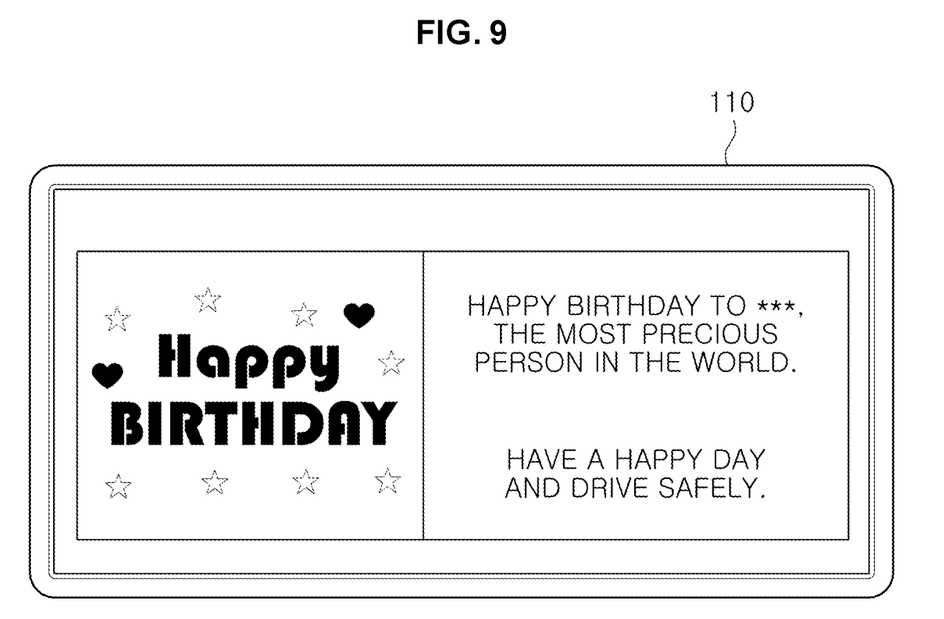
FIG. 9 and FIG. 10 are views exemplarily illustrating an example in which a vehicle according to an exemplary embodiment of the present disclosure outputs a birthday guide message.
Figure 10:
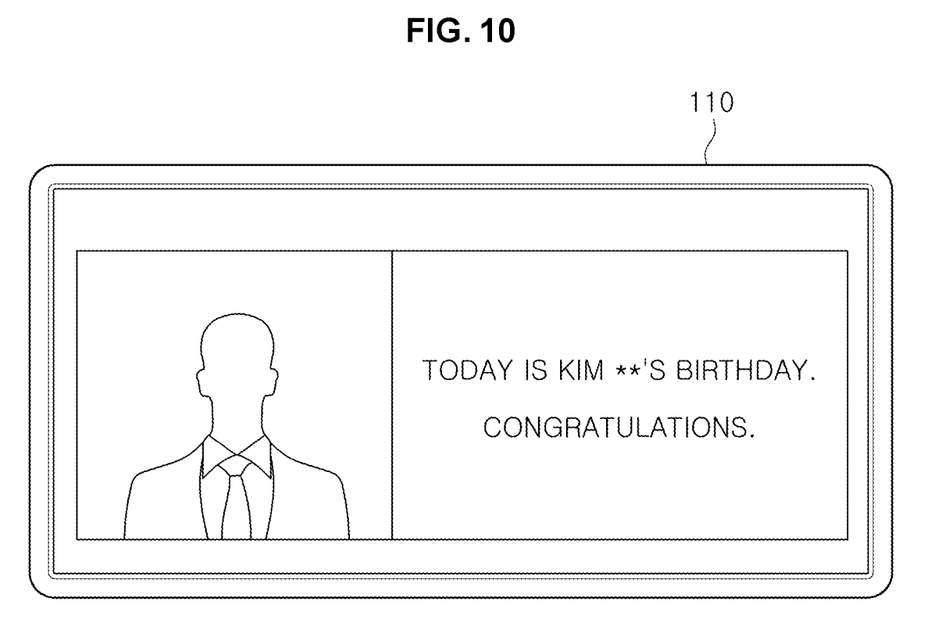

FIG. 9 and FIG. 10 are views exemplarily illustrating an example in which the vehicle 10 according to an exemplary embodiment of the present disclosure outputs a birthday guide message.

Referring to FIG. 9 and FIG. 10, in response to receiving birthday data from the user terminal 20 through the communicator 120, the vehicle 10 according to various exemplary embodiments of the present disclosure may control the user interface 110 to output a birthday guide message based on the birthday data.

The vehicle 10 may receive the birthday data stored in the user terminal 20 or the birthday data obtained by the user terminal 20 from the Internet (e.g., social network service (SNS)) from the user terminal 20. In the instant case, the birthday data may include information related to not only the birthday of the user of the vehicle 10 but also the birthdays of nearby people.

As shown in FIG. 9, the vehicle 10 according to an exemplary embodiment compares the image data obtained from the indoor image sensor 140 with the birthday data, and in response to determining that an occupant with a birthday exists may control the user interface 110 to output the birthday guide message.

The vehicle 10 may identify the occupant based on image processing (e.g., a face recognition) for image data captured from the indoor image sensor 140, determine whether any of the identified occupants has a birthday on the boarding date based on the birthday data, and control the user interface 110 to output the birthday guide message in response that the occupant including a birthday among the occupants exists.

Furthermore, as shown in FIG. 10, in response to determining that a friend including a birthday exists based on the birthday data, the vehicle 10 may control the user interface 110 to output the birthday guide message.

The vehicle 10 may identify a friend whose birthday is on the boarding date of the user based on the birthday data, and control the user interface 110 to output the birthday guide message including the identified friend's profile and guiding the birthday.

Hereinafter, an exemplary embodiment of a method for controlling the vehicle 10 according to an aspect of the present disclosure will be described. The vehicle 10 according to the above-described embodiment may be used as a method of controlling the vehicle 10. Accordingly, the developments described above with reference to FIGS. 1 to 10 may be equally applied to the method of controlling the vehicle 10.

Figure 11:
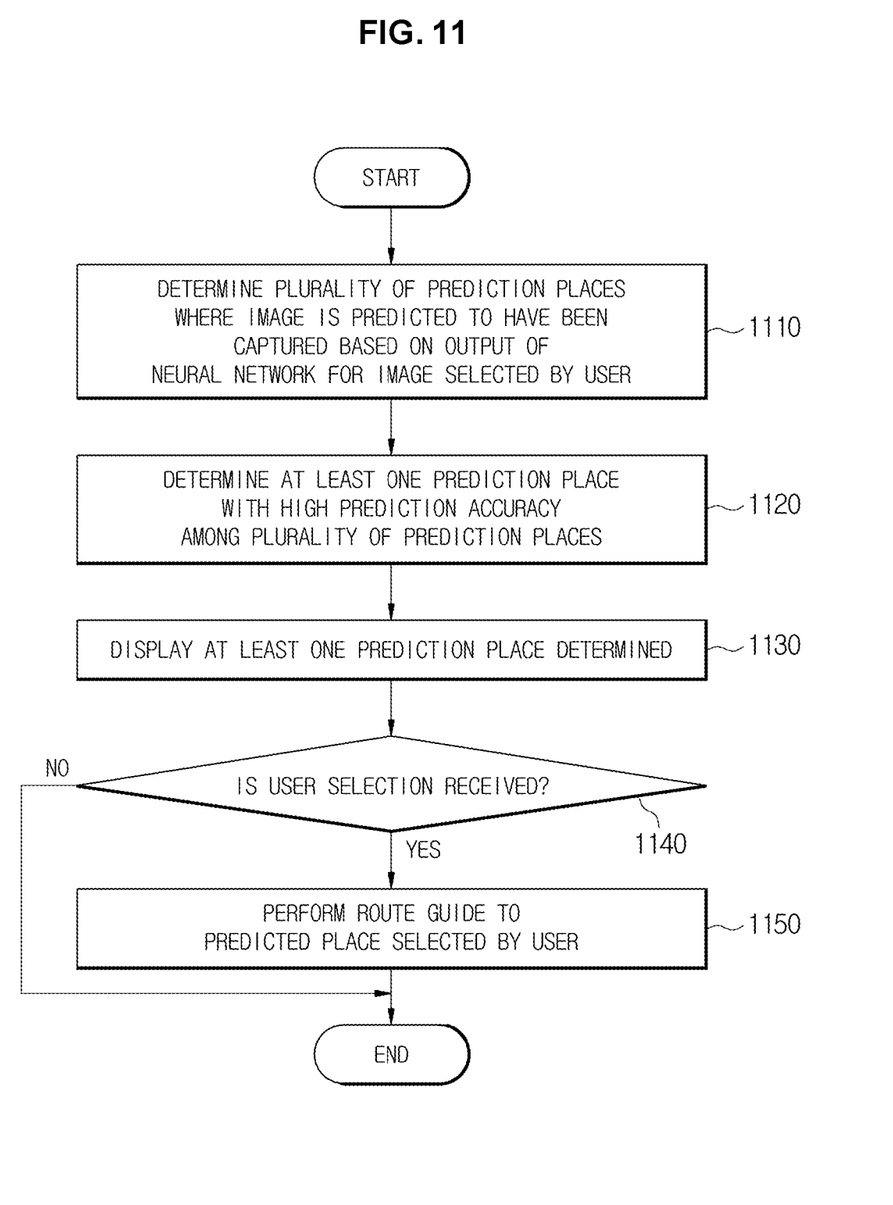
FIG. 11 is a flowchart illustrating a case of recommending a destination based on an image selected by a user among methods of controlling a vehicle according to an exemplary embodiment of the present disclosure.

FIG. 11 is a flowchart illustrating a case of recommending the destination based on the image selected by the user among methods of controlling the vehicle 10 according to an exemplary embodiment of the present disclosure.

Referring to FIG. 11, the vehicle 10 according to various exemplary embodiments of the present disclosure may determine the plurality of prediction places where an image is predicted to have been captured based on the output of the neural network for the image selected by the user (1110). In the instant case, the neural network may be learned as the images tagged with the place information (e.g., place name or place information (GPS coordinates, etc.)).

The vehicle 10, according to an exemplary embodiment of the present disclosure, may receive the image selected by the user from the user terminal 20 through the communicator 120. In other words, the user may select the image by use of the user terminal 20, and in the instant case, the user terminal 20 transmits the image selected by the user to the vehicle 10 so that the vehicle 10 may identify the image selected by the user.

The vehicle 10, according to an exemplary embodiment of the present disclosure, may control the user interface 110 to display the received image in response to receiving the image stored in the user terminal 20 from the user terminal 20 through the communicator 120, and determine the image selected by the user based on the user selection for any one of the images displayed through the user interface 110.

In the instant case, the images stored in the user terminal 20 may be photographed by the user terminal 20, obtained on the Internet by the user, or photographed by the vehicle 10. In other words, the vehicle 10, according to an exemplary embodiment of the present disclosure, may control the communicator 120 to transmit the image data obtained from the external image sensor 130 to the user terminal 20, and the user terminal 20 may store the images transmitted from the vehicle 10. Accordingly, when the user desires to guide the vehicle 10 to a place of the image captured while traveling, the user may be provided with a route guide to the place by selecting the corresponding image.

The vehicle 10 according to various exemplary embodiments of the present disclosure may determine at least one prediction place with high prediction accuracy among the plurality of prediction places (1120), display the determined at least one prediction place (1130), and in response to receiving the user selection (YES in 1140) perform the route guide to the predicted place selected by the user (1150).

Accordingly, the user may select an image of a place where he/she wants to go from among the images stored in the user terminal 20 through the user terminal 20 or the vehicle 10 and be provided with the route guide from the vehicle 10 to the corresponding place. In other words, even if the user does not know where the place in the image is, the user may receive the route guide from the vehicle 10.

Figure 12:
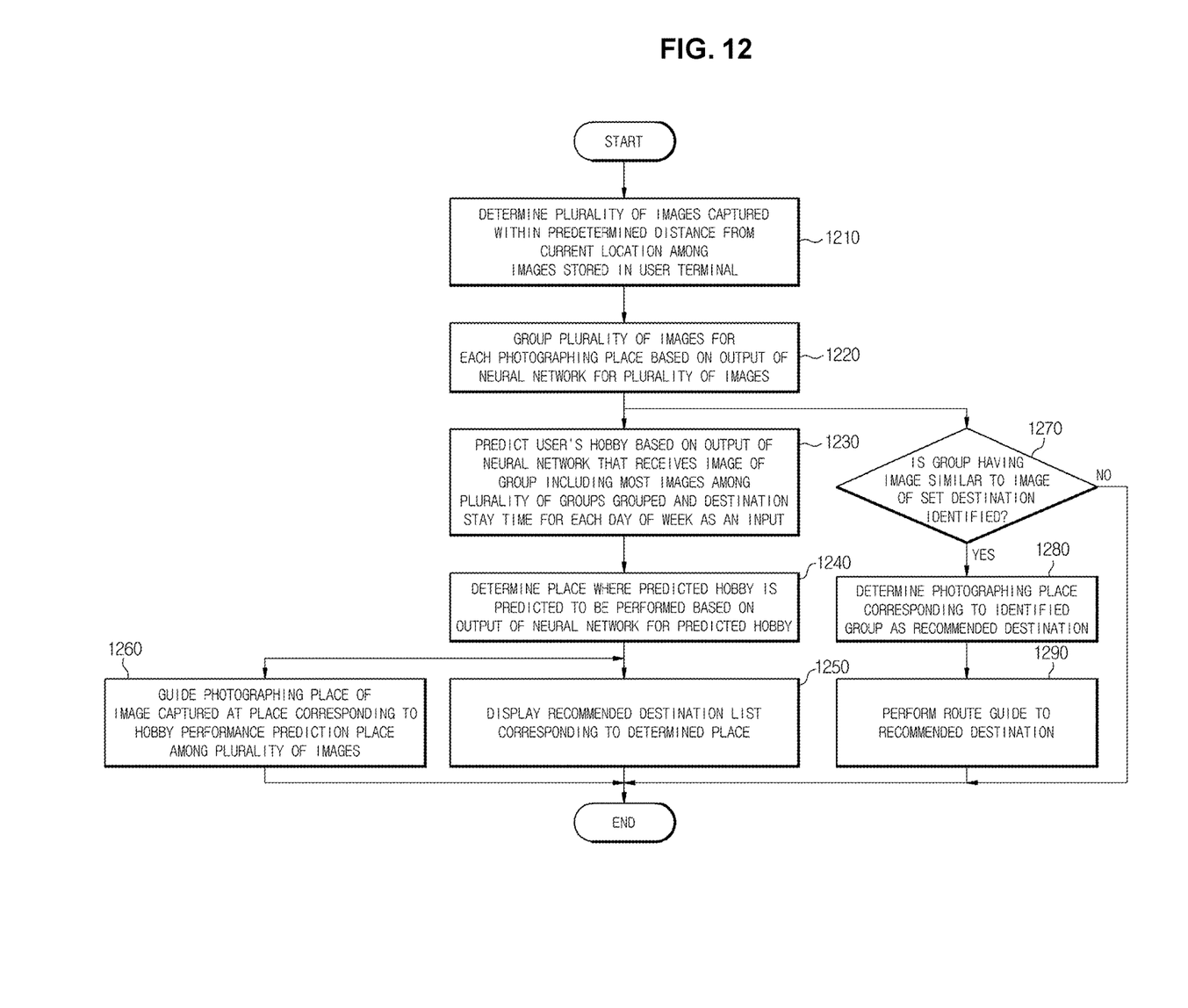
FIG. 12 is a flowchart illustrating a case of recommending a destination based on past captured images among methods of controlling a vehicle according to an exemplary embodiment of the present disclosure.

FIG. 12 is a flowchart illustrating a case of recommending the destination based on a past captured image methods of controlling a vehicle according to an exemplary embodiment of the present disclosure.

Referring to FIG. 12, the vehicle 10 according to various exemplary embodiments of the present disclosure may determine the plurality of images captured within the predetermined distance from the current location among the images stored in the user terminal 20 (1210), and group the plurality of images for each photographing place based on the output of the neural network, for the plurality of images (1220).

The vehicle 10 according to various exemplary embodiments of the present disclosure may predict the user's hobby based on the output of the neural network that receives the image of the group including the most images among the plurality of groups grouped and the destination stay time for each day of the week as an input (1230), determine a place where the predicted hobby is predicted to be performed based on the output of the neural network for the predicted hobby (1240), and display the recommended destination list corresponding to the determined place (1250).

Furthermore, the vehicle 10 according to various exemplary embodiments of the present disclosure may guide a photographing place of an image captured at a place corresponding to the hobby performance prediction place among the plurality of images (1260).

In other words, the vehicle 10 may control the user interface 110 to guide the user to the memory place by determining a photographing place of the image captured at a place corresponding to the hobby performance prediction place as the memory place.

Furthermore, the vehicle 10 according to an exemplary embodiment of the present disclosure, in response to the group including an image similar to the image of the set destination is identified (Yes in 1270), may determine a photographing place corresponding to the identified group as the recommended destination (1280) and perform the route guide to the recommended destination (1290).

In other words, the vehicle 10 according to an exemplary embodiment of the present disclosure, in response that the place including the image similar to the destination set by the user exists within the predetermined distance, may guide the corresponding place and perform the route guide to the corresponding place based on the user selection.

Figure 13:
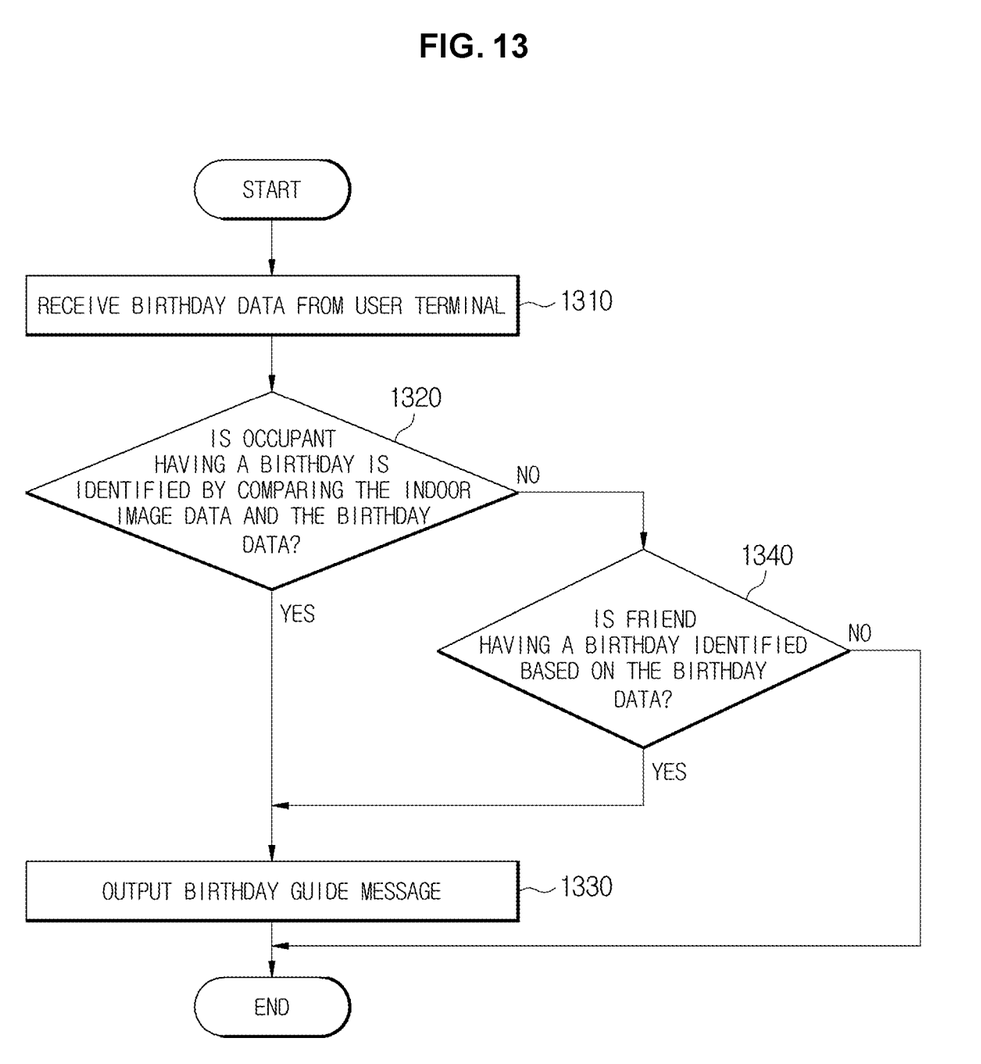
FIG. 13 is a flowchart illustrating a case in which a birthday guide message is output based on birthday data among methods of controlling a vehicle according to an exemplary embodiment of the present disclosure.

FIG. 13 is a flowchart illustrating a case of outputting the birthday guide message based on birthday data among methods of controlling a vehicle according to an exemplary embodiment of the present disclosure.

Referring to FIG. 13, the vehicle 10 according to various exemplary embodiments of the present disclosure may receive the birthday data from the user terminal 20 (1310).

The vehicle 10 may receive the birthday data stored in the user terminal 20 or the birthday data obtained by the user terminal 20 from the Internet (e.g., SNS) from the user terminal 20. In the instant case, the birthday data may include information related to not only the birthday of the user of the vehicle 10 but also the birthdays of nearby people.

The vehicle 10 according to various exemplary embodiments of the present disclosure may output the birthday guide message (1330), in response that an occupant including a birthday is identified by comparing the indoor image data and the birthday data (Yes in 1320).

The vehicle 10 may identify the occupant based on image processing (e.g., face recognition) for image data captured from the indoor image sensor 140, determine whether any of the identified occupants has a birthday on the boarding date based on the birthday data, and control the user interface 110 to output the birthday guide message in response that the occupant including a birthday among the occupants exists.

Furthermore, the vehicle 10 according to an exemplary embodiment of the present disclosure, in response to determining that a friend including a birthday exists based on the birthday data (Yes in 1340), may output the birthday guide message (1330).

The vehicle 10 may identify a friend whose birthday is on the boarding date of the user based on the birthday data, and control the user interface 110 to output the birthday guide message including the identified friend's profile and guiding the birthday.

As is apparent from the above, the exemplary embodiments of the present disclosure may provide a vehicle configured for improving user convenience by predicting the destination based on the output of the neural network for the images stored in the user terminal or proposing the destination that matches the user's hobby, and the method of controlling the same.

On the other hand, the above-described embodiments may be implemented in a form of a recording medium storing commands executable by a computer. The commands may be stored in a form of program code. When the commands are executed by a processor, a program module is generated by the commands so that the operations of the disclosed exemplary embodiments of the present disclosure may be conducted. The recording medium may be implemented as a computer-readable recording medium.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data non-transitory storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
   a user interface;
   a communicator communicatively connected to a controller and configured to perform communication with a user terminal;
   the controller communicatively connected to the user interface and configured to:
   determine a predicted place where an image is predicted to have been captured according to an output of a place prediction neural network for the image selected by a user, and
   control the user interface to perform a route guide to the predicted place,
   wherein the place prediction neural network is learned from an image tagged with a place information, and
   wherein the controller is further configured to:
   receive an image stored in the user terminal from the user terminal through the communicator,
   control the user interface to display the received image,
   determine the image selected by the user based on a user selection for one of displayed images through the user interface, determine a plurality of images captured within a predetermined distance from a current location of the vehicle among images stored in the user terminal,
group the plurality of images for each photographing place based on the output of the place prediction neural network for the plurality of images, and
determine a predicted hobby predicted as a hobby of the user based on an output of a hobby prediction neural network that receives an image of a group including the most images among a plurality of groups grouped and a destination stay time for each day of the week as an input thereof.

2. A method of controlling a vehicle including a user interface, the method comprising:
determining, by a controller communicatively connected to the user interface, a predicted place where an image is predicted to have been captured according to an output of a place prediction neural network for an image selected by a user; and
controlling, by the controller, the user interface to perform a route guide to the predicted place,
wherein the place prediction neural network is learned from an image tagged with a place information, and
wherein the method further includes:
receiving, by a communicator, an image stored in a user terminal from the user terminal;
controlling, by the controller, the user interface to display the received image;
determining, by the controller, the image selected by the user based on a user selection for one of displayed images through the user interface;
determining, by the controller, a plurality of images captured within a predetermined distance from a current location of the vehicle among images stored in the user terminal;
grouping, by the controller, the plurality of images for each photographing place based on the output of the place prediction neural network for the plurality of images;
determining, by the controller, a predicted hobby predicted as a hobby of the user based on an output of a hobby prediction neural network that receives an image of a group including the most images among a plurality of groups grouped and a destination stay time for each day of the week as an input thereof;
determining, by the controller, a hobby performance prediction place where the predicted hobby is expected to be performed based on the output of the hobby performance place prediction neural network for the predicted hobby; and
controlling, by the controller, the user interface to display a list of recommended destinations corresponding to the hobby performance prediction place.

3. The method of claim 2, further including:
an external image sensor configured for photographing an outside of the vehicle,
wherein the method further includes controlling, by the controller, the communicator to transmit an image data obtained from the external image sensor to the user terminal.

4. The vehicle of claim 1, including:
an external image sensor configured for photographing an outside of the vehicle,
wherein the controller is further configured to control the communicator to transmit an image data obtained from the external image sensor to the user terminal.

5. The vehicle of claim 1, wherein the controller is further configured to:
in response that the predicted place is plural, determine at least one prediction place with high prediction accuracy among a plurality of prediction places,
control the user interface to display information on the at least one prediction place, and
control the user interface to perform the route guide to the predicted place selected through the user interface among the prediction places.

6. The method of claim 2, wherein the controlling further includes:
in response that the predicted place is plural, determining, by the controller, at least one prediction place with high prediction accuracy among the plurality of prediction places;
controlling, by the controller, the user interface to display information on the at least one prediction place; and
controlling, by the controller, the user interface to perform the route guide to the predicted place selected through the user interface among the at least one prediction place.

7. The vehicle of claim 1, wherein the controller is further configured to:
in response to receiving a birthday data from the user terminal through the communicator, control the user interface to output a birthday guide message based on the birthday data.

8. The vehicle of claim 1, wherein the controller is further configured to:
determine a hobby performance prediction place where the predicted hobby is expected to be performed according to the output of the hobby performance place prediction neural network for the predicted hobby, and
control the user interface to display a list of recommended destinations corresponding to the hobby performance prediction place.

9. The vehicle of claim 8, wherein the controller is further configured to:
control the user interface to guide a photographing place of an image captured at a place corresponding to the hobby performance prediction place among the plurality of images.

10. The vehicle of claim 1, wherein the controller is further configured to:
in response that a group including an image similar to an image of a destination input by the user within a predetermined distance from a current location of the vehicle among the plurality of groups grouped is identified, determine a photographing place corresponding to the group as a recommended destination, and
control the user interface to perform a route guide to the recommended destination.

11. The vehicle of claim 7, wherein the controller is further configured to control the user interface to output the birthday guide message in response to determining that a predetermined person having a birthday exists based on the birthday data.

12. The vehicle of claim 7, further including:
an indoor image sensor configured for photographing an interior of the vehicle,
wherein the controller is further configured to control the user interface to output the birthday guide message in response to determining that an occupant with a birthday exists by comparing the birthday data with image data obtained from the indoor image sensor.

* * * * *